US012399019B1

(12) United States Patent
Rosa et al.

(10) Patent No.: US 12,399,019 B1
(45) Date of Patent: Aug. 26, 2025

(54) EFFICIENT NETWORK-GRAPH FRAMEWORK AND QUERY SYSTEM FOR CARGO ROUTES

(71) Applicant: XPO, Inc., Greenwich, CT (US)

(72) Inventors: Charles Rosa, Rochester Hills, MI (US); Eric Chriscinske, Ann Arbor, MI (US); Viatcheslav Kochepasov, Ypsilanti, MI (US); Tanmaya Mathur, Seattle, WA (US)

(73) Assignee: XPO, Inc., Greenwich, CT (US)

( * ) Notice: Subject to any disclaimer, the term of this patent is extended or adjusted under 35 U.S.C. 154(b) by 225 days.

(21) Appl. No.: 18/358,440

(22) Filed: Jul. 25, 2023

(51) Int. Cl.
G01C 21/34 (2006.01)

(52) U.S. Cl.
CPC .................. *G01C 21/3446* (2013.01)

(58) Field of Classification Search
None
See application file for complete search history.

(56) References Cited

U.S. PATENT DOCUMENTS

| 10,936,992 | B1* | 3/2021 | Rusnak | G06Q 10/06315 |
| 2012/0050531 | A1* | 3/2012 | Wu | G08B 13/08 |
| 2014/0372335 | A1* | 12/2014 | Jones | G06Q 10/0833 |
| | | | | 705/333 |
| 2022/0164765 | A1* | 5/2022 | Masche-Pakkala | |
| | | | | G06Q 10/08345 |
| 2022/0196416 | A1* | 6/2022 | Suzuki | B60W 60/0053 |
| 2023/0104886 | A1* | 4/2023 | Rusnak | G01C 21/3453 |
| | | | | 705/338 |
| 2023/0162137 | A1* | 5/2023 | Capozzi | G06Q 10/08355 |
| | | | | 705/338 |
| 2025/0112852 | A1* | 4/2025 | Rosa | H04L 45/123 |

* cited by examiner

*Primary Examiner* — Ryan Rink
(74) *Attorney, Agent, or Firm* — Kilpatrick Townsend & Stockton LLP

(57) ABSTRACT

One example described herein includes a system that can generate a default network graph based on a set of default network data. The default network graph can include a default set of routes through a network. The system can then generate move and load graphs based on the default network graph and network state data. The network state data can indicate a state of the network as of a point in time after the default network graph was generated. After generating the move and load graphs, the system can receive a query from a client device for routes that satisfy query parameters. The system can search the move and load graphs using a crawler to identify one or more routes that satisfy the query parameter. The system can then provide the one or more routes to the client device in a reply to the query.

20 Claims, 7 Drawing Sheets

EFFICIENT NETWORK-GRAPH FRAMEWORK AND QUERY SYSTEM FOR CARGO ROUTES

TECHNICAL FIELD

The present application generally relates to network graphs and, more particularly, relates to an efficient network-graph framework and query system for cargo routes.

BACKGROUND

Network graphs such as node-link diagrams can be used to show interrelationships and connections between objects. For example, a network graph can show the connections between hardware devices (e.g., routers, hubs, and compute nodes) of a computer network. Network graphs typically include nodes and links. The nodes may represent objects and the links may represent relationships between the objects.

SUMMARY

One example of the present disclosure includes a non-transitory computer-readable medium comprising program code that is executable by one or more processors to cause the one or more processors to perform operations. The operations can include generating a default network graph based on a set of default network data, the default network graph including a default set of routes for transporting cargo through a network. The operations can include generating a move graph based on the default network graph and network state data, the network state data indicating a state of the network as of a point in time after the default network graph was generated, and the move graph being separate from the default network graph and including move routes indicating how the cargo is moved through the network from origins to destinations. The operations can include generating a load graph based on the default network graph and the network state data, the load graph being separate from the move graph and the default network graph, the load graph including load routes indicating how cargo is loaded on and off of vehicles in the network, the load routes being distinct from the move routes. The operations can include receiving a query from a client device for routes that satisfy query parameters. The operations can include, in response to receiving the query, search the move graph and the load graph using a crawler to identify one or more routes that satisfy the query parameters. The operations can include providing the one or more routes to the client device in a reply to the query.

Another example of the present disclosure includes a method of operations. The operations can include generating a default network graph based on a set of default network data, the default network graph including a default set of routes for transporting cargo through a network. The operations can include generating a move graph based on the default network graph and network state data, the network state data indicating a state of the network as of a point in time after the default network graph was generated, and the move graph being separate from the default network graph and including move routes indicating how the cargo is moved through the network from origins to destinations. The operations can include generating a load graph based on the default network graph and the network state data, the load graph being separate from the move graph and the default network graph, the load graph including load routes indicating how cargo is loaded on and off of vehicles in the network, the load routes being distinct from the move routes. The operations can include receiving a query from a client device for routes that satisfy query parameters. The operations can include, in response to receiving the query, search the move graph and the load graph using a crawler to identify one or more routes that satisfy the query parameters. The operations can include providing the one or more routes to the client device in a reply to the query. The operations can be implemented by one or more processors.

Yet another example of the present disclosure includes a system comprising one or more processors and a memory. The memory includes instructions that are executable by the one or more processors to cause the one or more processors to perform operations. The operations can include generating a default network graph based on a set of default network data, the default network graph including a default set of routes for transporting cargo through a network. The operations can include generating a move graph based on the default network graph and network state data, the network state data indicating a state of the network as of a point in time after the default network graph was generated, and the move graph being separate from the default network graph and including move routes indicating how the cargo is moved through the network from origins to destinations. The operations can include generating a load graph based on the default network graph and the network state data, the load graph being separate from the move graph and the default network graph, the load graph including load routes indicating how cargo is loaded on and off of vehicles in the network, the load routes being distinct from the move routes. The operations can include receiving a query from a client device for routes that satisfy query parameters. The operations can include, in response to receiving the query, search the move graph and the load graph using a crawler to identify one or more routes that satisfy the query parameters. The operations can include providing the one or more routes to the client device in a reply to the query.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
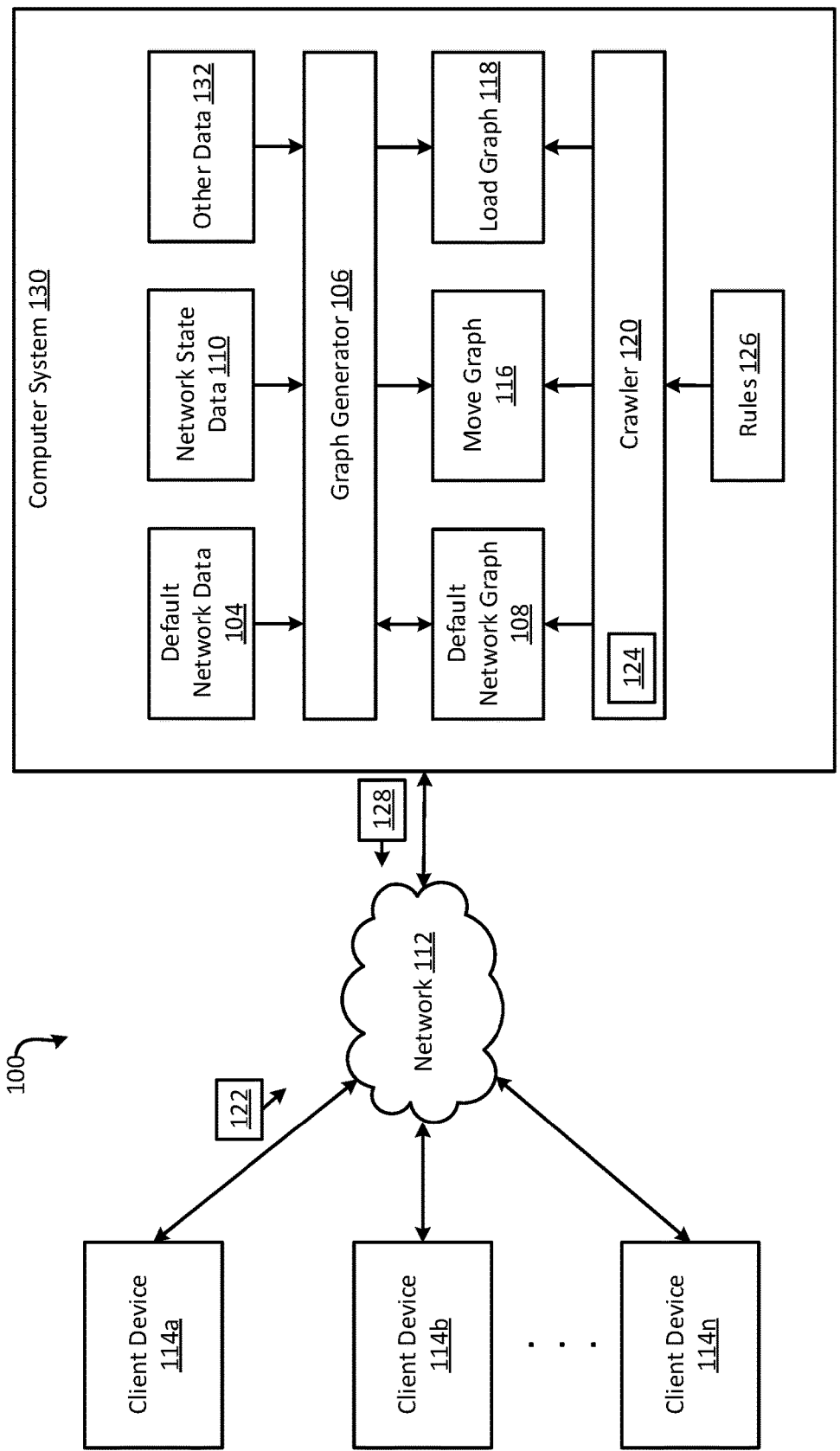
FIG. 1 shows a block diagram of an example of a system for implementing a network graph framework according to some aspects of the present disclosure.

Examples are described herein in the context of network graphs for cargo routes. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with various constraints, and that these specific goals will vary from one implementation to another and from one developer to another.

Network graphs are often used in a wide variety of industries to represent objects and their relationships. If the number of objects and relationships is small, a computer system can generate a network graph relatively quickly. But in certain contexts, the number of potential nodes and links may be so large that it is too slow to generate up-to-date network graphs, even using some of the fastest computer systems available. For example, in the context of cargo transport, a service provider may have a network of 300+ service centers, 50+ freight assembly centers, 10,000+ trucks, and other infrastructure. Attempting to construct a network graph that indicates all of the possible routes in which cargo (e.g., freight) can be transported through the network is a computationally intensive and slow task. For example, it may take days or longer to generate such a network graph using powerful servers, which may consume a significant amount of processing power and memory in the process.

Additionally, some networks are more dynamic than others. For example, the physical infrastructure of a computing cluster may be relatively fixed and thus may change very little over time. In contrast, a carrier network for transporting cargo can have many objects (e.g., trucks, drivers, trailers, and cargo) that move locations throughout a given day, which impacts the route options. For instance, a cargo route that is viable at time $t_1$ may be infeasible at time $t_2$ because the truck locations and cargo have changed. Because the carrier network's state is continuously changing, a network graph may become quickly outdated and need to be recomputed. But because of how long it can take to compute such network graphs, by the time the network graph is recomputed from scratch, it is outdated again.

Some examples of the present disclosure can overcome one or more of the abovementioned problems by providing a network graph framework for rapidly generating up-to-date network graphs of routes for transporting cargo through a carrier network. For example, a computer system can generate a default network graph based on a set of default network data. The default network graph can include a default set of routes for cargo through the carrier network. After generating the default network graph, the computer system can obtain network state data indicating a current state of the network, such as the locations of moving objects like cargo, trucks, trailers, and drivers in the network. The computer system can obtain the network state data from one or more data sources, such as other computer systems located at service centers and assembly centers throughout the country. Based on the default network graph and the network state data, the computer system can automatically generate a move graph and a load graph. The move graph can indicate move routes. A move route can include a sequence of move legs. A move leg can include holding cargo at its current location or, alternatively, transporting cargo from the current location to the next location. Thus, even though it is referred to as a "move leg," a move leg may include a cargo hold for a certain time period (e.g., for one or more shifts) at a given location. The load graph can include load routes. A load route can include a sequence of load legs. A load leg can include loading cargo onto a vehicle (e.g., a truck or trailer), holding cargo at its current location, or offloading cargo from a vehicle. The computer system can then use this framework of the default network graph, the move graph, and the load graph to rapidly respond to queries from client devices for route data.

By starting from the default network graph to derive the move and load graphs, the computer system has a significant computational head-start that allows it to generate those graphs faster and using fewer computing resources (e.g., memory, processing power, and energy) than may otherwise be possible. For instance, this may be significantly faster and less resource intensive than computing the move and load graphs from scratch each time. Also, separating the routes into move routes and load routes, which are distributed across two different graphs, can help simplify the computational problem so that it can be rapidly solved by the computer system.

Because the move and load graphs can be generated relatively quickly based on the current network-state data, the computer system can repeat the above process periodically. For example, the computer system can obtain updated network-state data and recompute the move and load graphs every hour. This can keep the move and load graphs up-to-date based on the current state of the network. The default network graph can also be recomputed periodically, albeit at a slower interval than the move and load graphs, after which the move and load graphs may be updated. For example, the default network graph can be recomputed weekly based on an updated set of default network data. In this way, the techniques described herein can make it both fast and practical for a computer system to generate up-to-date network graphs in the cargo transport context, when conventionally it is neither.

In some examples, the computer system can save the move graph and the load graph in memory (e.g., RAM), so that the graphs can be rapidly accessed and searched. After storing them in memory, the computer system can use a specialized crawler to search the graphs to identify routes (e.g., move routes or load routes) that satisfy queries from client devices. In some examples, the crawler can be configured to execute a bidirectional search process, which significantly expedite the process of identifying routes that satisfy the query parameters, thereby reducing latency and improving responsiveness. Additionally or alternatively, the crawler can be programmed to follow a set of rules to help it identify routes faster than may otherwise be possible. By dividing up the routes into move routes and load routes in different graphs that are stored in memory, as well as providing an intelligent crawler, the computer system can more rapidly search through route options to generate query results using fewer computing resources than may otherwise be possible.

In some examples, the move graph and the load graph can be spatiotemporal graphs in which each node represents not only a location but a time. For example, each node may represent a physical location, such as a service center, as well as a time, such as a particular time window during a 24-hour day. Because each node corresponds to a location and time, each link between nodes not only specifies a spatial path between the corresponding locations, but also specifies the times of day at which the path starts and ends. Generating the move and load graphs as spatiotemporal graphs, rather than just spatial graphs, may be particularly useful in the cargo transport context, because the network is in a constant state of flux throughout the day as pickup and delivery operations are ongoing.

This illustrative example is given to introduce the reader to the general subject matter discussed herein and the disclosure is not limited to this example. The following sections describe various additional non-limiting examples.

FIG. 1 shows a block diagram of an example of a system 100 for implementing a network graph framework according to some aspects of the present disclosure. The system 100 includes a computer system 130 comprising one or more computing devices. Examples of the computing devices can include servers, desktop computers, laptop computers, or any combination of these. In some examples, the computer system 130 can be a distributed computing system that includes multiple networked nodes (e.g., physical or virtual machines) in communication with one another. Examples of such a distributed computing system can include a cloud computing system, a computing cluster, or a data grid.

The computer system 130 can be configured to automatically generate network graphs usable in the transport context to identify routes for cargo through a carrier network. There can be many such routes, some of which may be static and others of which may be dynamic. As a result, it is normally slow and computationally challenging to generate such network graphs. But in some examples, the computer system 130 can apply a network graph framework that can simplify and expedite the process. The network graph framework may be distributed across multiple nodes of the computer system 130 and performed in parallel, in some examples, to further expedite the computations.

More specifically, the computer system 130 can receive a set of default network data 104. The computer system 130 can receive the default network data 104 from one or more data sources, such as one or more databases or computing devices. The default network data 104 may be created by a network operator or another user based on known information about the state (e.g., topology) of the network and other knowledge. The default network data 104 can include a default set of routes for transporting cargo through the network. Each route can be defined by a set of parameters including an origin location, a start time (e.g., origin day and origin shift), a destination location, an end time (e.g., destination day and destination shift), and/or a transport mode. The transport mode can indicate which entity is to transport cargo along the route. One such transport mode can be a carrier mode, in which the carrier (operating the network) transports cargo along the route. Another transport mode can be a third-party mode, in which a third party (e.g., another carrier company) transports cargo along the route. Each route can include one or more legs between the origin location and the destination location, where each leg can involve the transport of cargo between two locations.

The default set of routes can serve as a baseline set of routes for transporting cargo through the network. The default network data 104 can be valid for a certain time interval, such as one week. During that time interval, the default network data 104 can remain fixed (e.g., unchanged). At the end of that time interval, the default network data 104 can be updated. By periodically updating the default network data 104, such as at a weekly interval, it can remain relatively current.

After receiving the default network data 104, the computer system 130 can execute a graph generator 106. The graph generator 106 is software that can generate a default network graph 108 based on the default network data 104. The default network graph 108 can include nodes and links. The nodes can represent physical locations in the network, such as physical sorting and assembly locations in a carrier network. The nodes may also represent times of day. For instance, each node can represent an individual location, day, and shift (e.g., a work shift at a company) that spans a certain time period (e.g., 9:00 AM-5:00 PM) on that particular day. Links between nodes can represent routes between the locations/shifts. For example, a link can extend from an outbound shift at a first location to an inbound shift at a second location. Thus, the default network graph 108 can be a spatiotemporal graph that includes both location and time dimensions.

To generate the default network graph 108, the graph generator 106 can begin by establishing the nodes based on the current physical locations in the network, which can be described in the default network data 104. In some examples, rather than generating a single node per location, the graph generator 106 can create multiple nodes per location, where each node represents a different time of day at that location. For example, if there are 4 shifts in a 24-hour day at a given location, the graph generator 106 can create four nodes for that location, where each node represents the location and a different one of the shifts. The various shifts at each location can also be defined in the default network data 104, which can dictate how many nodes are created per location.

After generating the nodes, the graph generator 106 can generate links between the nodes for valid routes between the nodes. The routes may also be defined in the default network data 104. In some examples, the graph generator 106 can rely on a set of predefined constraints or rules to generate the nodes and/or links. For example, given how carrier services operate, it may be that cargo is always sent out from a location during an outbound shift and is always received at the location during an inbound shift. Thus, the graph generator 106 can impose a constraint that any leg starting at an outbound shift of a first location should end at an inbound shift of a second location. And because cargo is not sent out during inbound shifts, if that route continues on from the second location to a third location, the next leg should start at the outbound shift of the second location and extend to the inbound shift of the third location. These and other constraints can be applied to establish valid routes in both time and space from various origins to destinations throughout the network.

In some examples, the graph generator 106 can determine the routes for the default network graph 108 using one or more optimization algorithms. The optimization algorithms can be configured to select the routes based on one or more constraints and one or more objective functions. Because the selected routes can be whichever combination of routes best satisfies the objective function(s) subject to the constraints, those routes can be referred to as an optimal set of routes. The optimization algorithms can be configured to iteratively analyze the route options to identify the optimal set of routes. The default network graph 108 can then be configured with the optimal set of routes. Once generated, the default network graph 108 can serve as a foundation from which additional graphs, such as a move graph 116 and a load graph 118, can be generated.

After generating the default network graph 108, the computer system 130 can receive network state data 110. The network state data 110 can indicate the current state of the network (e.g., the current locations of vehicles, drivers, and cargo in the network) as of the point in time when it was collected. The network state data 110 may be gathered from one or more other computing devices, which may be positioned at various locations throughout the network. For example, the network may include client devices 114a-n positioned at service centers and assembly centers throughout the network. As trucks arrive at and leave each location, and as cargo arrives at and leaves each location, individuals at those locations can input corresponding data into the corresponding client device to keep the system 100 up-to-date about the current operations in the network. The computer system 130 can communicate with each of these client devices 114a-n, for example via application programming interfaces, to automatically collect such information to generate the network state data 110. These communications may take place via a communications network 112, which may include a public network (e.g., the Internet) and/or a private network (e.g., a local area network).

In some examples, the computer system 130 can also receive other data 132 relating to various factors that affect the network state, such as weather and traffic information which may affect the available routes, holiday and weekend information which may affect the number of drivers and amount of cargo, etc. The computer system 130 can receive some or all of this information by communicating with third party systems, such as weather and traffic services, via the communications network 112.

Based on the default network graph 108 and the network state data 110, the graph generator 106 can generate a move graph 116. The graph generator 106 may also generate the move graph 116 based on the other data 132. The move graph 116 can be separate from the default network graph 108. The move graph 116 can include move routes indicating how cargo can be moved through the network from origins to destinations. Each move route can be defined by a set of parameters including an origin location, a start time (e.g., start day and shift), a destination location, an end time (e.g., end day and shift), and/or a transport mode. Each move route can include one or more move legs between the origin location and the destination location. Each move leg can involve the transport of cargo between two locations or holding cargo at a given location for a certain time period. Because the move graph 116 is generated based on the network state data 110, it can be more up-to-date than the default network graph 108. And by starting from the default network graph 108, the move graph 116 can be generated significantly faster and with less computational overhead than generating the entire move graph 116 from scratch.

To generate the move graph 116, the graph generator 106 can start from the default network graph 108 and make adjustments to account for the current state of the network (e.g., current truck and cargo locations) along with other factors, such as weather conditions, delays, possible deviations from default routes, etc. This may involve adding routes, removing routes, or changing existing routes based on the current state of the network and the other factors. For example, after the default network graph 108 was generated, a truck may have driven from a first location to a second location to deliver a package. Because the truck is no longer at the first location, a route involving the truck driving from the first location to the second location may be invalid until the truck returns to the first location. By taking these kinds of factors into account, the move graph 116 can account for changes in the network that have occurred since the default network graph 108 was generated, so that the move graph 116 is more up-to-date than the default network graph 108.

Figure 2:
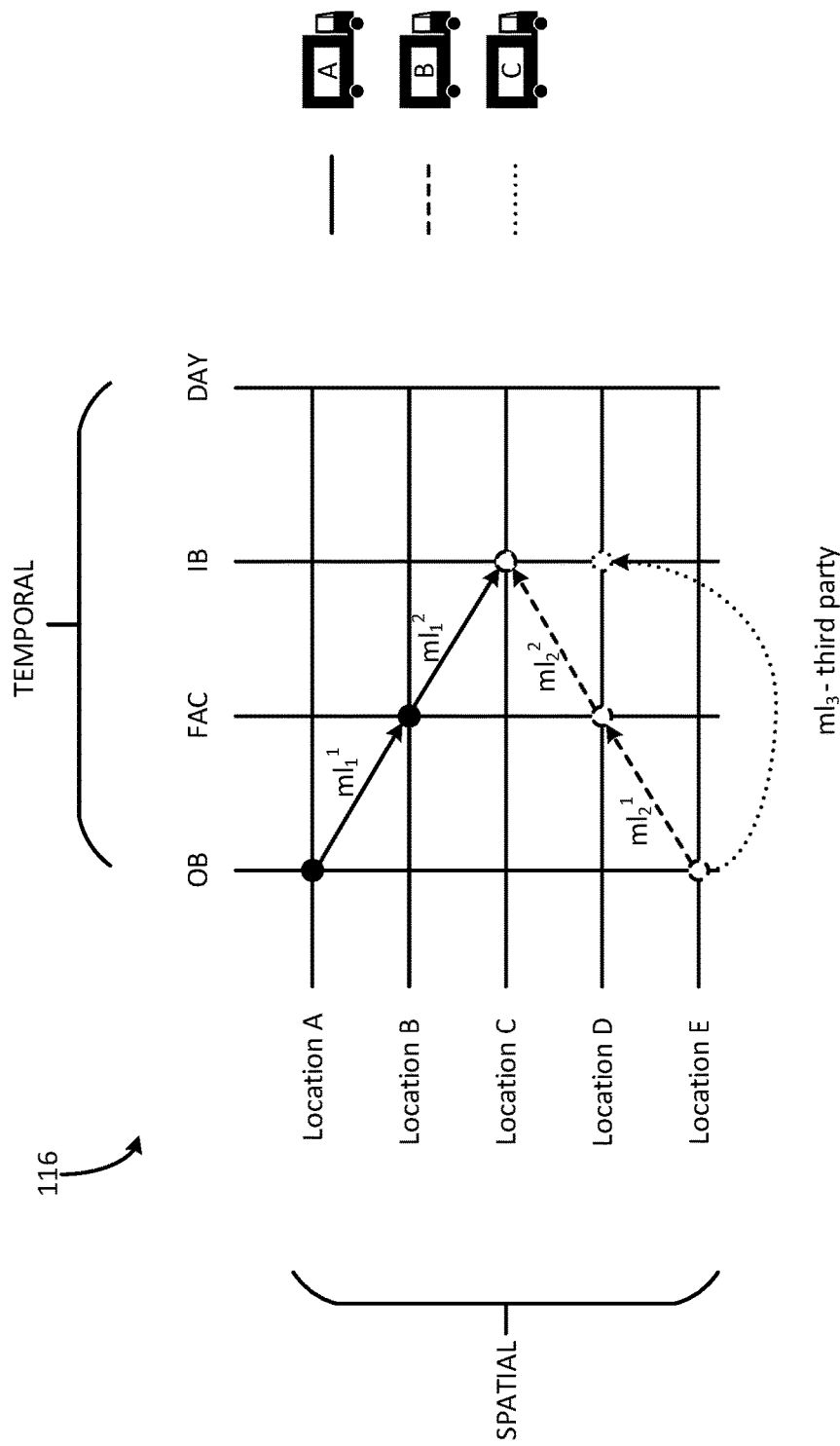
FIG. 2 shows an example of a move graph according to some aspects of the present disclosure.

Like the default network graph 108, the move graph 116 may be a spatiotemporal graph in which each node represents not only a location but a time. One example of such a move graph 116 is shown in FIG. 2. As shown, the move graph 116 includes five locations—Location A through Location E. The move graph 116 also includes four shifts per location per day—an outbound shift (OB), a freight assembly center shift (FAC), an inbound shift (IB), and a day shift (DAY). As shown, the move graph 116 includes three move routes between those locations and shifts. The first move route is depicted in a solid line and extends from the outbound shift at Location A to the inbound shift at Location C. It includes two move legs, labeled $ml_1^1$ and $ml_1^2$. The second move route is depicted in a dashed line and extends from the outbound shift at Location E to the inbound shift at Location C. It includes two move legs, labeled $ml_2^1$ and $ml_2^2$. The third move route is depicted in a dotted line and extends from the outbound shift at Location E to the inbound shift at Location D. It includes one move leg, labeled $ml_3$. In some examples, the one or more of the move routes may be implemented by a third party carrier service to assist the carrier, for example if the carrier does not have trucks positioned to make the trip or if the carrier does not have drivers wo can be out on the road for the duration of the trip. In the example shown in FIG. 2, the third move route is implemented by such a third party carrier service. Of course, these examples are simplified for illustrative purposes. In normal operation, the move graph 116 may have hundreds or thousands of move routes that extend between dozens or hundreds of locations, with each move route including any number of move legs performed by the carrier and/or third party carrier services.

Figure 4:
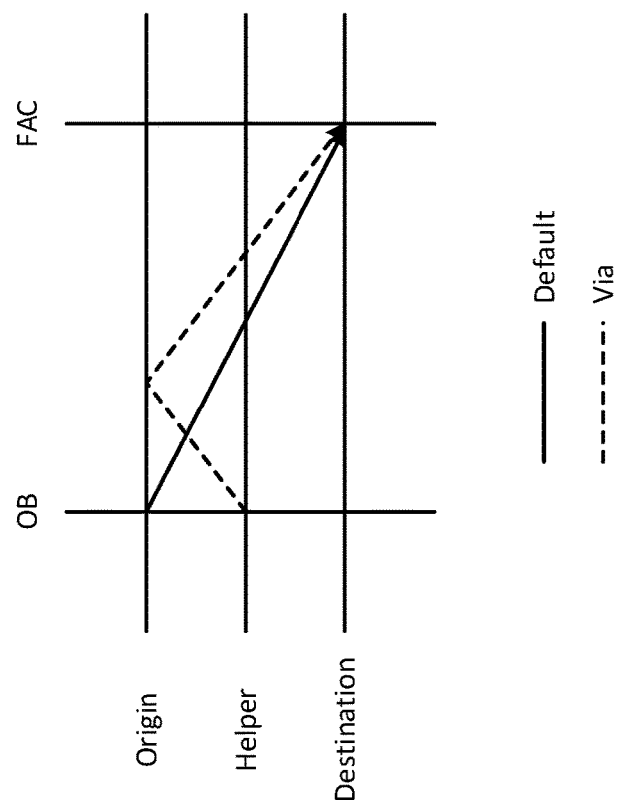
FIG. 4 shows an example of a via according to some aspects of the present disclosure.

In some examples, the move graph 116 may include vias. Vias are another strategy for moving freight in a carrier network, such as an LTL (less-than-truckload) network, even if vehicles and drivers are not all in the correct position for the cargo encountered that day. Vias can be useful when an origin location has to move more trailers than it has vehicles or drivers to do so. In this situation, a helper can be used. A helper can be an additional driver or vehicle. The helper can drive from a helper location to the origin location, pick up one or more of the "uncovered" trailers, and move them to destination on behalf of the origin location. In this way, the trailers are delivered to the destination by the helper. This route from the helper location through the origin location to the destination location is referred to as a via. One example of such a via is shown in graph 400 of FIG. 4. As shown, the helper location is helping the origin location (during the outbound shift) move a trailer to the destination location (during the FAC shift).

Referring back to FIG. 1, in some examples, the graph generator 106 can additionally or alternatively generate a load graph 118. The graph generator 106 can generate the load graph 118 based on default network graph 108 and the network state data 110. In some examples, the graph generator 106 may also generate the load graph 118 based on the other data 132. The load graph 118 can be separate from the move graph 116 and the default network graph 108. The load graph 118 can include load routes indicating how cargo is loaded and unloaded through the network from origins to destinations. Each load route can be defined by a set of parameters including an origin location, a start time, a destination location, an end time, and/or a transport mode. Each load route can include one or more load legs between the origin location and the destination location, where each load leg can involve loading cargo onto a vehicle or off-loading cargo from the vehicle. Because the load graph 118 is generated based on the network state data 110, it can be more up-to-date than the default network graph 108. And by starting from the default network graph 108, the load graph 118 can be generated significantly faster and with less computational overhead than generating the entire load graph 118 from scratch.

To generate the load graph 118, the graph generator 106 can start from the default network graph 108 and make adjustments to account for the current state of the network (e.g., current truck and cargo locations) along with other factors, such as weather conditions, delays, possible deviations from default routes, etc. This may involve adding routes, removing routes, or changing existing routes based on the current state of the network and the other factors. For example, after the default network graph 108 was generated, weather problems may have closed a route. So, the graph generator 106 can account for the closed route. By taking these kinds of factors into account, the move graph 116 can account for changes in the network that have occurred since the default network graph 108 was generated, so that the load graph 118 is more up-to-date than the default network graph 108.

Figure 5:
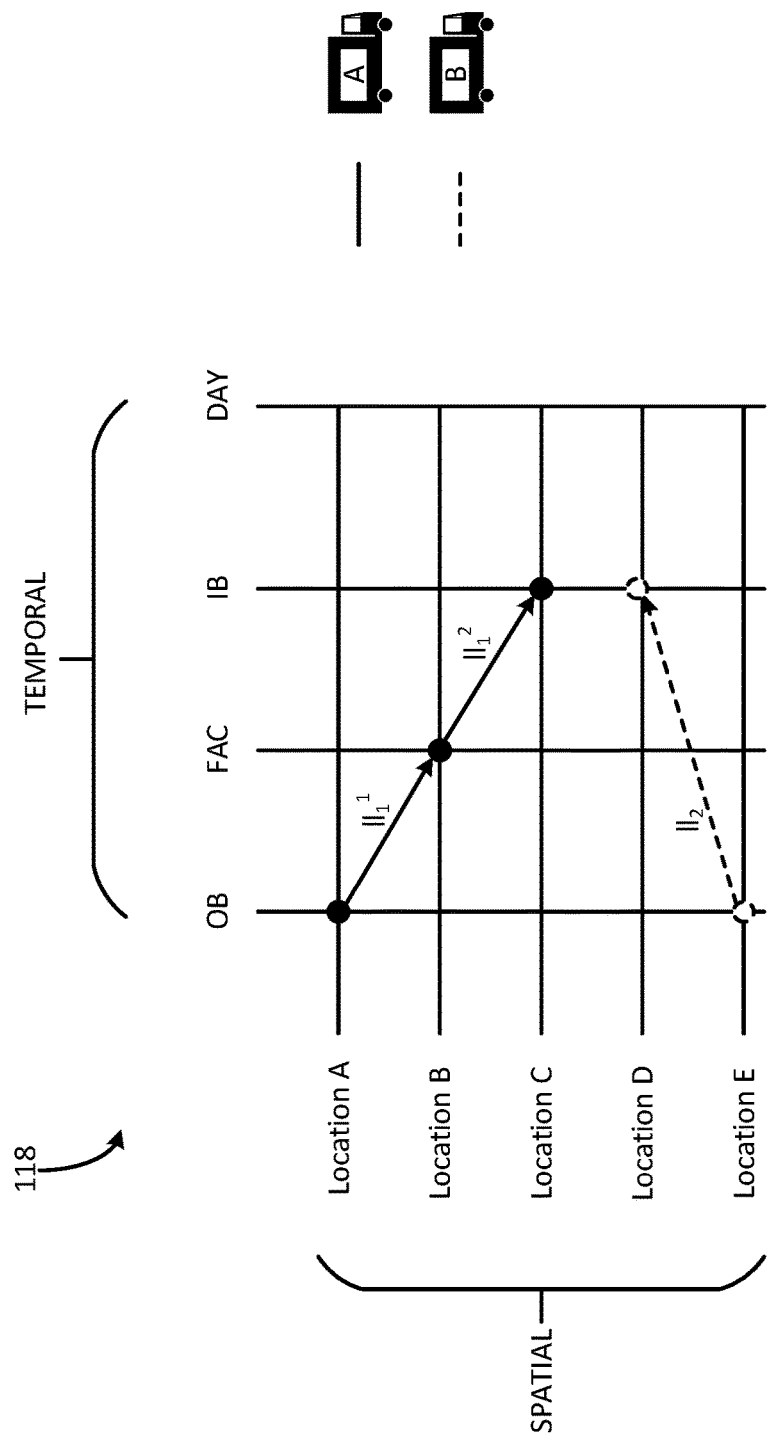
FIG. 5 shows an example of a load graph according to some aspects of the present disclosure.

Like the default network graph 108, the load graph 118 may be a spatiotemporal graph in which each node represents not only a location but a time (e.g., a day and shift). One example of such a load graph 118 is shown in FIG. 5. As shown, the load graph 118 includes five locations—Location A through Location E. The load graph 118 also includes four shifts per location per day—outbound, FAC, inbound, and DAY. As shown, the load graph 118 includes two load routes between those locations and shifts. The first load route is depicted in a solid line and extends from the outbound shift at Location A to the inbound shift at Location C. It includes two load legs, labeled $ll_1^1$ and $ll_1^2$. The first load leg ($ll_1^1$) may involve loading cargo onto a truck during the outbound shift on a particular day at Location A, and then offloading the cargo from the truck during the FAC shift at Location B. The second load leg ($ll_1^2$) may involve loading cargo onto a truck during the FAC shift at Location B and offloading the cargo from the truck during the inbound shift at Location C. The second load route is depicted in a dashed line and extends from the outbound shift at Location E to the inbound shift at Location D. It includes one load leg, labeled $ll_2^2$. That load leg can involve loading cargo onto a truck during the outbound shift at Location E and offloading the cargo from the truck during the inbound shift at Location D. Of course, these examples are simplified for illustrative purposes. In normal operation, the load graph 118 may have hundreds or thousands of load routes between dozens or hundreds of locations, with each load route including any number of load legs performed by the carrier and/or third party carrier services. Like the move graph 116, in some examples the load graph 118 can include vias.

In some examples, the load graph 118 may specify diversions from default routes. A diversion can be an additional or alternative route that is a modification of a default route. A diversion may be required or desired for any number of reasons, for example if a load leg along a default route is not currently viable (e.g., due to traffic or weather conditions) or because of the cargo in the network that day. For instance, depending on which cargo is in the network on that day, by using alternative load routes for all or a portion of the cargo going from an origin to a destination, the cargo can be packed in fewer trailers, thus requiring fewer tractors to move the cargo. This can result in significant savings to the carrier.

Figure 3:
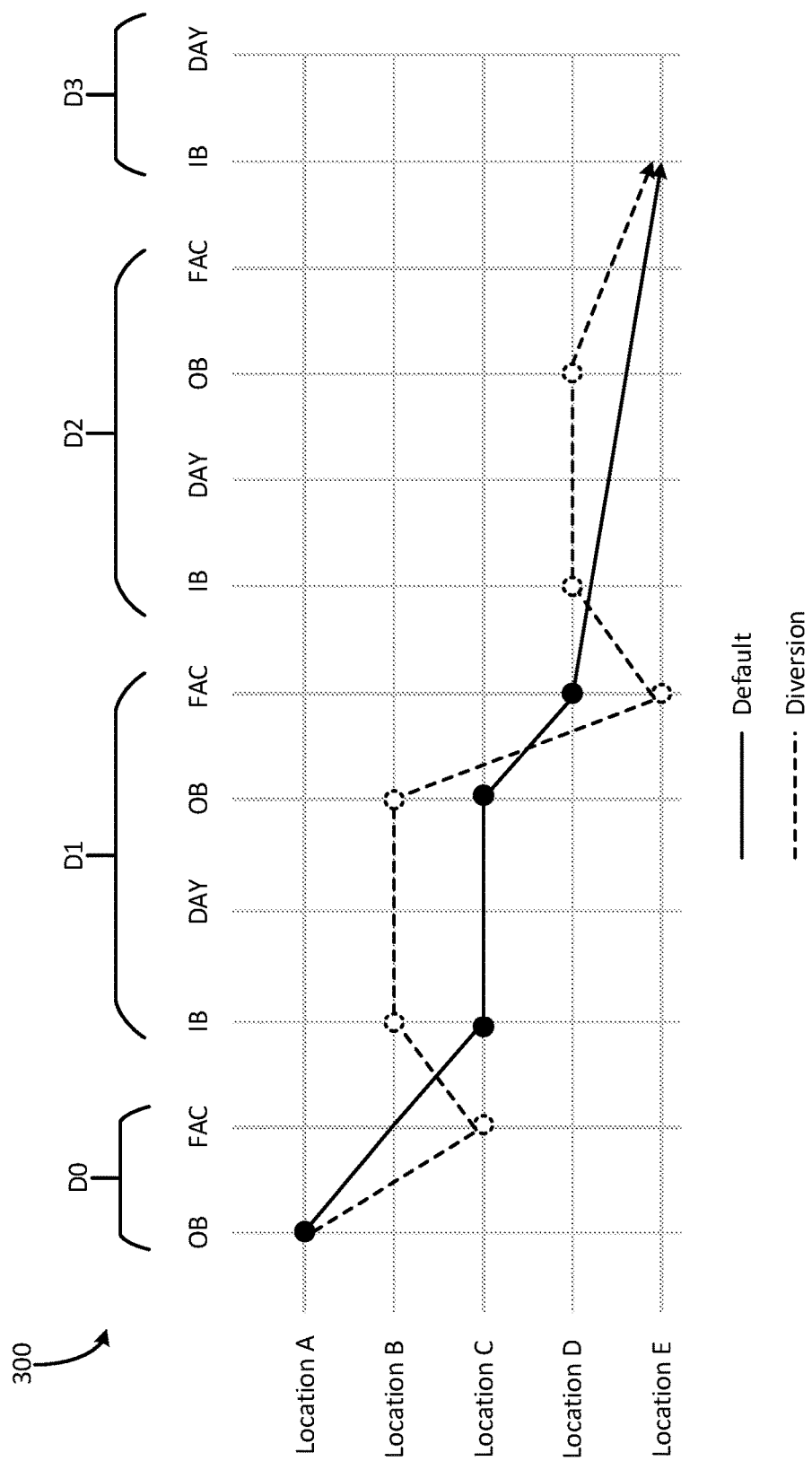
FIG. 3 shows an example of a diversion according to some aspects of the present disclosure.

One example of a diversion is shown in FIG. 3. As shown, the load graph 300 includes a default route that extends from Location A to Location E. The default route can span four days, designated D0-D3. The default route can include four load legs—outbound at Location A to inbound at Location C, inbound at Location C to outbound at Location C, outbound at Location C to FAC at Location D, and FAC at Location D to inbound at Location E. Note that the third load leg involves holding the cargo at Location C from the inbound shift to the outbound shift. Holds may be beneficial if the cargo is ahead of schedule, because they can be tactically used to pack more cargo onto fewer, fuller trailers. The load graph 300 also includes a diversion that extends from Location A to Location E. The diversion can include seven load legs—outbound at Location A to FAC at Location C, FAC at Location C to inbound at Location B, inbound at Location B to outbound at Location B, outbound at Location B to FAC at Location E, FAC at Location E to inbound at Location D, inbound at Location D to outbound at Location D, and outbound at Location D to inbound at Location E. The graph generator 106 may include this diversion for any suitable reason, for example of Location C is inaccessible (e.g., due to construction) and is no longer a viable intermediary.

Referring back to FIG. 1, after generating the move graph 116 and the load graph 118, they may each be stored in memory. For example, one or both of the graphs 116, 118 may be stored in random access memory (RAM). This may allow the graphs 116, 118 to be quickly accessed and searched in response to queries 122 from client devices, such as client devices 114a-n.

More specifically, a client device 114a can transmit a query 122 to the computer system 130 for routes that satisfy certain query parameters. Examples of the query parameters can include an origin location, an origin time, a destination location, a destination time, whether diversions are allowed, a maximum amount of diversion time or diversion distance that is acceptable, whether a certain transport mode is allowed, or any combination of these. For example, the client device 114a may request all routes spanning from Raleigh, North Carolina to Los Angeles, California between March 1 and March 10. In response to receiving the query 122, the computer system 130 can execute an intelligent crawler 120 to search the default network graph 108, the move graph 116, and/or the load graph 118 for one or more routes that satisfy the query parameters. The crawler 120 can search the graphs while they are in memory, which can expedite the search process. The computer system 130 can then provide the one or more identified routes to the client device 114a in a reply 128 to the query 122.

The crawler 120 can include logic for searching through the graphs to identify the routes that satisfy the query parameters. In some examples, the logic can include a bidirectional search algorithm 124. A bidirectional search algorithm 124 is a graph search algorithm that finds the shortest path from an origin location to a destination location. It runs two simultaneous searches—one forward from the origin location and one backward from the destination location—stopping when the two meet. A bidirectional search can be faster and less complex than a unidirectional search, because a bidirectional search splits the search process into two parts that are performed concurrently, where each part is only half the size of performing a unidirectional search all the way from the origin location to the destination location.

In some examples, the crawler 120 may use a predefined set of rules 126 to facilitate the search process. The rules 126 may account for business and other constraints that can be used to filter out routes and simplify the search process. The rules 126 may include static rules, dynamic rules, or both. A static rule is a rule whose application does not change over time. One example of a static rule may be that a certain entity (e.g., customer) does not want their cargo going through a certain location. The crawler 120 will always apply that rule with respect to that entity's cargo, until the rule is expressly revoked. A dynamic rule is a rule whose application depends on one or more dynamic factors, such as time. One example of a dynamic rule can be to ignore certain routes depending on the time of day, since the route may have more or less traffic at different times. By applying the set of rules 126, the crawler 120 may know to ignore certain routes or focus on certain routes to expedite the search process, thereby reducing consumption of computing resources.

As noted earlier, over time, the computer system 130 can receive updated network-state data 110 and/or updated other data 132. The computer system 130 can then use this updated data 110, 132 to update the move graph 116 and the load graph 118. The computer system 130 can perform these updates periodically, for example hourly or daily. Because the move graph 116 and load graph 118 can be updated more frequently than the default network graph 108, those graphs 116, 118 can be more up-to-date than the default network graph 108.

Figure 6:
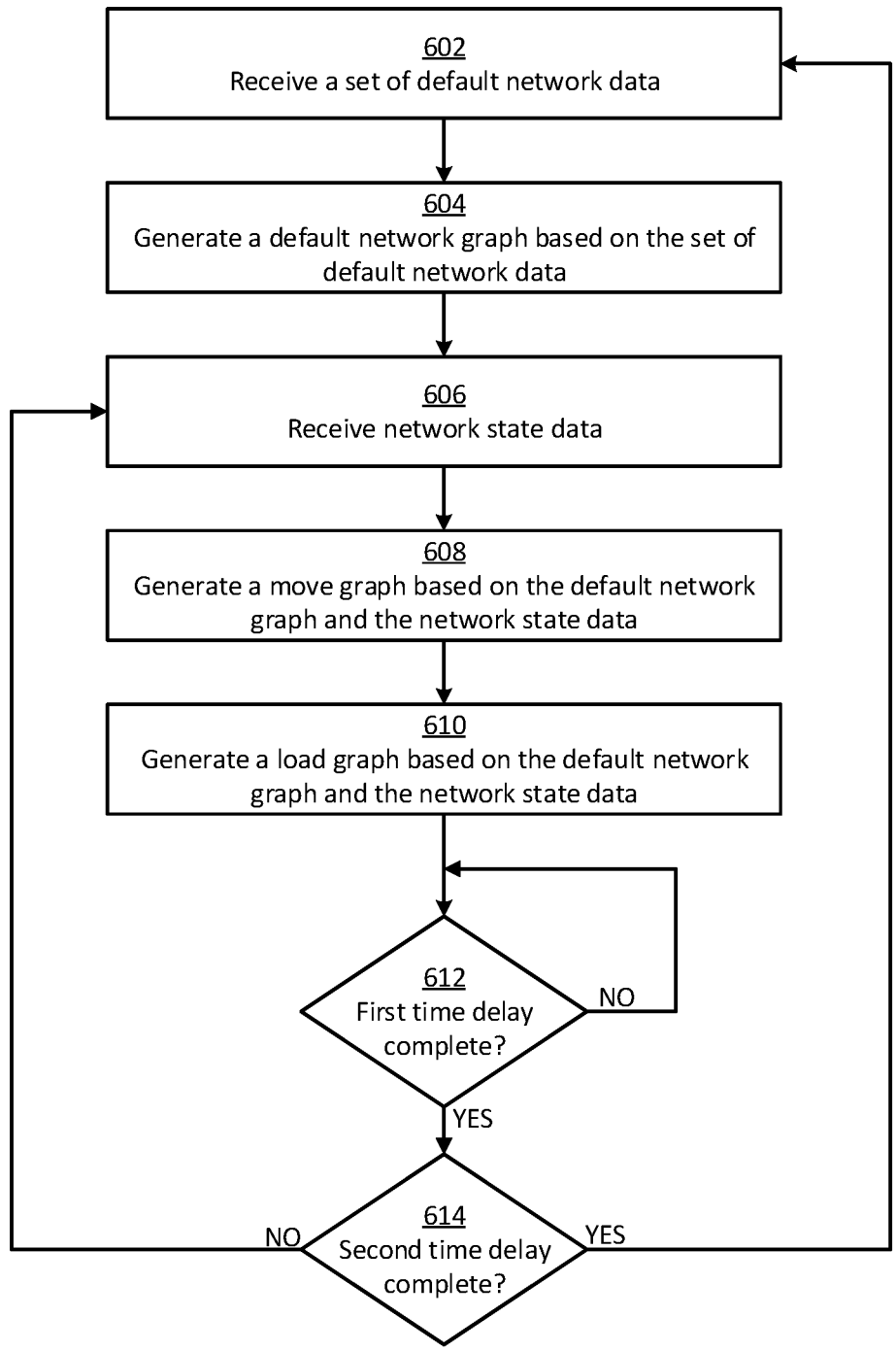
FIG. 6 shows a flowchart of an example of a process for generating network graphs according to some aspects of the present disclosure.

Turning now to FIG. 6, shown is a flowchart of an example of a process for generating network graphs according to some aspects of the present disclosure. Other examples may involve more operations, fewer operations, different operations, or a different sequence of operations than is shown in FIG. 6. The operations of FIG. 6 are described below with reference to the components of FIG. 1 described above.

In block 602, a computer system 130 receives a set of default network data 104 from one or more sources, such as one or more databases. The computer system 130 may receive the default network data 104 from the one or more sources via a communications network 112. In some examples, the network can be a carrier network and the default network data 104 can include a default set of routes for transporting cargo through the carrier network. Alternatively, the network may be another type of network (e.g., other than a carrier network) and the default set of routes may be for transmitting other types of content through the network. For example, the network may be a computer network that includes multiple hardware devices. In some such examples, the default set of routes may be for transmitting files (e.g., images or videos) through the computer network.

In block 604, the computer system 130 generates a default network graph 108 based on the default network data 104. For example, the computer system 130 can execute a graph generator 106 to generate the default network graph 108. The graph generator 106 may begin by generating the nodes in the default network graph 108. In the cargo context, the nodes can correspond to physical locations, operated by the carrier, through which cargo is transported in the network. In other contexts, the nodes may correspond to hardware components, such as network hubs or routers, or software components, such as virtual machines and software applications. After generating the nodes, the graph generator 106 can establish links between the nodes. In some examples, the graph generator 106 may adhere to one or more predefined constraints to establish the nodes and links. The predefined constraints may be configured to prevent against problems, such as duplicate routes or conflicting routes. Duplicate routes are two or more routes that are substantially identical to one another. Conflicting routes are two or more routes that conflict with one another, for example in time or space.

In block 606, the computer system 130 receives network state data 110. The computer system 130 can receive the network state data 110 from one or more sources, such as the client devices 114a-n positioned at the physical locations in the network or other components corresponding to the nodes. For example, in the cargo transport context, the computer system 130 can receive the network state data 110 from some or all of the client devices positioned at some or all of the physical locations in the network. In other contexts, the computer system 130 can receive the network state data 110 from some or all of the hardware or software components in the network.

In block 608, the computer system 130 generates a move graph 116 based on the default network graph 108 and the network state data 110. In some examples, the computer system 130 may further generate the move graph 116 based on other data 132. The move graph 116 includes move routes, which are distinct from load routes, though in some cases aspects of the two may overlap (e.g., they may have one or more overlapping legs).

In block 610, the computer system 130 generates a load graph 118 based on the default network graph 108 and the network state data 110. In some examples, the computer system 130 may further generate the load graph 118 based on other data 132. The load graph 118 includes load routes, which are distinct from the move routes, as noted above.

In block 612, the computer system 130 determines whether a first time delay is complete. The first time delay can be a period of time between updates to the move graph 116 and the load graph 118. In other words, the first time delay can correspond to the frequency at which the move graph 116 and the load graph 118 are updated. If the first time delay is not complete, the computer system 130 can wait until it is complete. Once it is complete, the process can continue to block 614.

In block 614, the computer system 130 determines whether a second time delay is complete. The second time delay can be a period of time between updates to the default network graph 108. In other words, the second time delay can correspond to the frequency at which the default network graph 108 is updated. The second time delay can be longer than the first time delay. If the second time delay is not complete, the process can return to block 606 and repeat, for example to update the move graph 116 and the load graph 118 based on updated network-state data 110. If the second time delay is complete, the process can return to block 602 and repeat, for example to update the default network graph 108, the move graph 116, and/or the load graph 118. This process can integrate any number of times to periodically update the graphs 108, 116, 118 at different frequencies.

Figure 7:
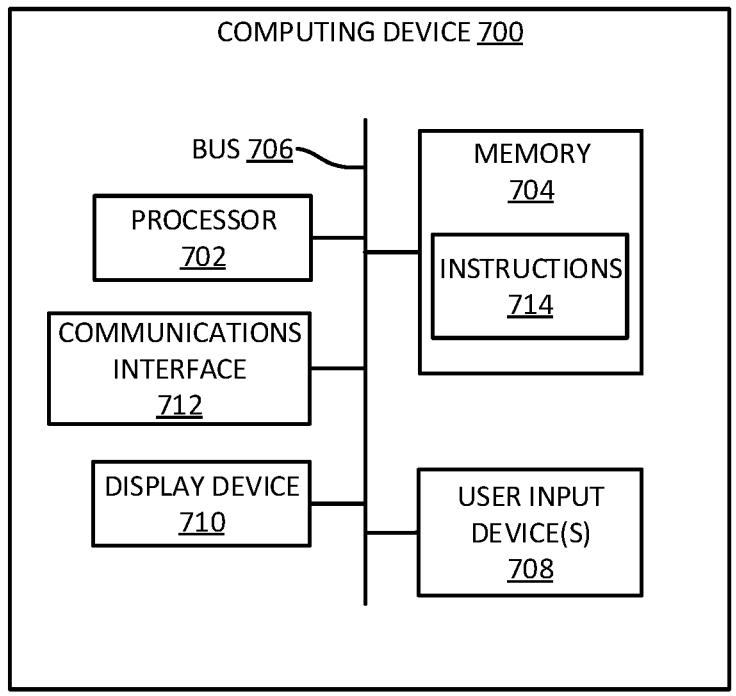
FIG. 7 shows a block diagram of an example of a computing system usable to implement some aspects of the present disclosure.

Turning now to FIG. 7, shown is a block diagram of an example of a computing device 700 usable to implement some aspects of the present disclosure. In some examples, the computing device 700 may correspond to any of the client devices or computer systems described above.

The computing device 700 includes a processor 702 that is in communication with the memory 704 and other components of the computing device 700 using one or more communications buses 706. The processor 702 is configured to execute processor-executable instructions 714 stored in the memory 704 to perform one or more processes described herein.

As shown, the computing device 700 also includes one or more user input devices 708 (e.g., a keyboard, mouse, touchscreen, video capture device, and/or microphone) to accept user input and the display device 710 to provide visual output to a user. The computing device 700 further includes a communications interface 712. In some examples, the communications interface 712 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A non-transitory computer-readable medium comprising program code that is executable by one or more processors to cause the one or more processors to:
generate a default network graph based on a set of default network data, the default network graph including a default set of routes for transporting cargo through a network;
generate a move graph based on the default network graph and network state data, the network state data indicating a state of the network as of a point in time after the default network graph was generated, the move graph being separate from the default network graph and including move routes indicating how the cargo is moved through the network from origins to destinations;
generate a load graph based on the default network graph and the network state data, the load graph being separate from the move graph and the default network graph, the load graph including load routes indicating how cargo is loaded on and off of vehicles in the network, the load routes being distinct from the move routes;
receive a query from a client device for routes that satisfy query parameters;
in response to receiving the query, search the move graph and the load graph using a crawler to identify one or more routes that satisfy the query parameters; and
provide the one or more routes to the client device in a reply to the query.

2. The non-transitory computer-readable medium of claim 1, wherein the move graph and the load graph each include nodes that represent locations and times, and wherein links between the nodes represent routes.

3. The non-transitory computer-readable medium of claim 1, wherein at least one of the move routes includes a sequence of move legs in which the cargo is received from a first location at a second location, held at the second location for at least one shift, and then transported from the second location to a third location.

4. The non-transitory computer-readable medium of claim 1, wherein each of the load routes is defined by a set of parameters that includes (i) a start location at which the cargo is loaded onto a vehicle, (ii) a start time at which the cargo is loaded onto the vehicle, (ii) an end location at which the cargo is offloaded from the vehicle, and (iv) an end time at which the cargo is offloaded from the vehicle.

5. The non-transitory computer-readable medium of claim 1, wherein each of the move routes and the load routes includes a transport mode parameter.

6. The non-transitory computer-readable medium of claim 1, further comprising program code that is executable by the one or more processors to cause the one or more processors to:
receive updated network-state data from one or more sources, the updated network-state data indicating an updated state of the network;
update the move graph based on the updated network-state data; and
update the load graph based on the updated network-state data.

7. The non-transitory computer-readable medium of claim 1, wherein the crawler is configured to execute a bidirectional search process to identify the one or more routes.

8. The non-transitory computer-readable medium of claim 7, wherein the crawler is configured to follow a dynamic rule set to identify the one or more routes.

9. A method comprising:
generating, by one or more processors, a default network graph based on a set of default network data, the default network graph including a default set of routes for transporting cargo through a network;
generating, by the one or more processors, a move graph based on the default network graph and network state data, the network state data indicating a state of the network as of a point in time after the default network graph was generated, the move graph being separate from the default network graph and including move routes indicating how the cargo is moved through the network from origins to destinations;
generating, by the one or more processors, a load graph based on the default network graph and the network state data, the load graph being separate from the move graph and the default network graph, the load graph including load routes indicating how cargo is loaded on and off of vehicles in the network, the load routes being distinct from the move routes;
receiving, by the one or more processors, a query from a client device for routes that satisfy query parameters;
in response to receiving the query, searching, by the one or more processors, the move graph and the load graph using a crawler to identify one or more routes that satisfy the query parameters; and
providing, by the one or more processors, the one or more routes to the client device in a reply to the query.

10. The method of claim 9, wherein the move graph and the load graph each include nodes that represent locations and times, and wherein links between the nodes represent routes.

11. The method of claim 9, wherein at least one of the move routes includes a sequence of move legs in which the cargo is received from a first location at a second location, held at the second location for at least one shift, and then transported from the second location to a third location.

12. The method of claim 9, wherein each of the load routes is defined by a set of parameters that includes (i) a start location at which the cargo is loaded onto a vehicle, (ii) a start time at which the cargo is loaded onto the vehicle, (iii) an end location at which the cargo is offloaded from the vehicle, and (iv) an end time at which the cargo is offloaded from the vehicle.

13. The method of claim 9, wherein each of the move routes and the load routes includes a transport mode parameter.

14. The method of claim 9, further comprising program code that is executable by the one or more processors to cause the one or more processors to:
receive updated network-state data from one or more sources, the updated network-state data indicating an updated state of the network;
update the move graph based on the updated network-state data; and
update the load graph based on the updated network-state data.

15. The method of claim 9, wherein the crawler is configured to execute a bidirectional search process to identify the one or more routes.

16. The method of claim 9, wherein the crawler is configured to follow a dynamic rule set to identify the one or more routes.

17. A system comprising:
one or more processors; and
a memory including instructions that are executable by the one or more processors to cause the one or more processors to:
generate a default network graph based on a set of default network data, the default network graph including a default set of routes for transporting cargo through a network;
generate a move graph based on the default network graph and network state data, the network state data indicating a state of the network as of a point in time after the default network graph was generated, the move graph being separate from the default network graph and including move routes indicating how the cargo is moved through the network from origins to destinations;
generate a load graph based on the default network graph and the network state data, the load graph being separate from the move graph and the default network graph, the load graph including load routes indicating how cargo is loaded on and off of vehicles in the network, the load routes being distinct from the move routes;
receive a query from a client device for routes that satisfy query parameters;
in response to receiving the query, search the move graph and the load graph using a crawler to identify one or more routes that satisfy the query parameters; and
provide the one or more routes to the client device in a reply to the query.

18. The system of claim 17, wherein the move graph and the load graph each include nodes that represent locations and times, and wherein links between the nodes represent routes.

19. The system of claim 17, wherein the memory further includes instructions that are executable by the one or more processors to cause the one or more processors to:
receive updated network-state data from one or more sources, the updated network-state data indicating an updated state of the network;
update the move graph based on the updated network-state data; and
update the load graph based on the updated network-state data.

20. The system of claim 17, wherein the crawler is configured to execute a bidirectional search process to identify the one or more routes.

* * * * *